Jan. 30, 1951   D. E. CROOKER   2,540,043
VENTILATED TIRE
Filed Aug. 30, 1948

INVENTOR.
David E. Crooker
BY
Morrell & Morrell
ATTORNEYS.

Patented Jan. 30, 1951

2,540,043

UNITED STATES PATENT OFFICE 2,540,043

VENTILATED TIRE

David E. Crooker, Ontonagon, Mich., assignor of one-half to Lloyd L. Felker, Marshfield, Wis.

Application August 30, 1948, Serial No. 46,909

4 Claims. (Cl. 152—153)

This invention relates to improvements in ventilated tires.

It is an established fact that excessive heat generated in tires run at high speed is a factor which causes a large percentage of blowouts occurring in the present day, and many of these blowouts result in serious accidents. It follows, therefore, that a tire which is so constructed that it will maintain temperatures substantially lower than those of conventional tires, will not only increase the useful life of the tire, but will also make the highways much safer by reducing the number of blowouts and the number of accidents resulting therefrom.

It is therefore a general object of the invention to provide a tire construction wherein the tread is cooled by means of ventilating passages formed therein.

A further object of the invention is to provide a tire construction of the class described wherein the cooling action is hastened, during use of the tire, by forced draft passing through the ventilating passages therefore.

A further object of the invention is to provide a tire construction which eliminates the conventional rider strips and which has a smooth road contacting surface formed with a plurality of cup-shaped recesses.

A further object of the invention is to provide a tire construction of the class described wherein the recesses in the road contacting surface are so arranged that at all times during use substantially the same amount of rubber and the same number of recesses are in contact with the road, thereby avoiding uneven tread wear and noise.

A further object of the invention is to provide a tire construction of the class described wherein the recesses in the road contacting surface are arranged in transversely extending oblique rows, the recesses of one row being staggered with respect to those of adjacent rows, and wherein the recesses of each row are in communication at their inner ends with a transverse open ended passage which extends through the tread from one side of the tire to the other.

A further object of the invention is to provide a tire construction having the advantages of the cup-type tread without having the noise which the cup-type tread creates during use.

A further object of the invention is to provide an improved tire construction which is applicable during original manufacture or during a retreading operation.

With the above and other objects in view the invention consists of the improved ventilated tire construction and all of its parts and combinations, as set forth in the claims, and all equivalents thereof.

In the drawing accompanying and forming a part of this specification, wherein is shown one complete embodiment of the preferred form of the invention, and wherein the same reference numerals represent the same parts in all of the views.

Figure 1:
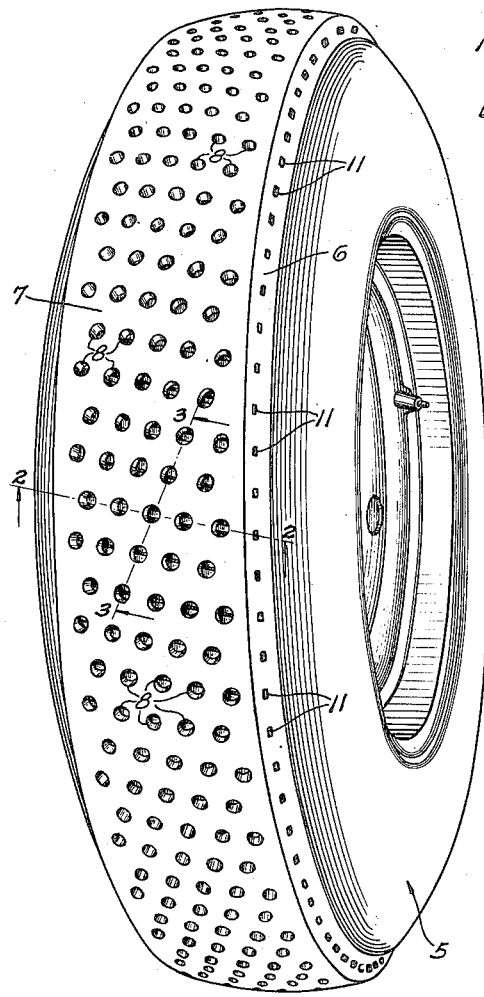
Fig. 1 is a perspective view of the improved tire construction.

Referring more particularly to the drawing, the numeral 5 indicates a tire embodying the improved construction. The tire 5 has a tread 6 which is preferably of substantially the same height as conventional rider strip tire treads and which has a substantially smooth road contacting surface 7.

Figure 4:
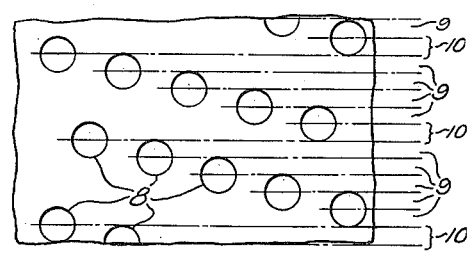
Fig. 4 is a fragmentary diagrammatical view of the improved tire tread.

The tread 6 is formed with a plurality of preferably circular recesses 8 which extend radially inwardly with respect to the axis of rotation of the tire as shown in Fig. 1. The recesses 8 are preferably arranged in transversely extending oblique rows as shown in Fig. 1 by the line 2—2. The recesses 8 of each row are preferably five in number and are equally spaced both longitudinally with respect to each row and circumferentially with respect to the tire. The recesses 8 of one row are preferably laterally staggered with respect to the recesses of the rows adjacent thereto. The spacing between adjacent rows of the recesses 8 and the angularity of said rows is such that when in use there is at all times substantially the same number of recesses 8 in contact with the roadbed. From Fig. 4 it is apparent that the circumferential distance 9 between the centers of any two adjacent recesses is equal to the circumferential distance 10 between the forward end recess in one row and the rearmost end recess of the next adjacent row.

Figure 2:
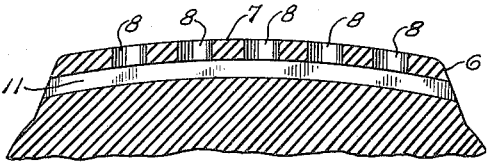
Fig. 2 is a transverse vertical sectional view of the improved tire tread taken along the line 2—2 of Fig. 1.
Figure 3:
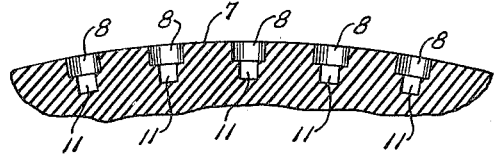
Fig. 3 is a vertical sectional view of the improved tire tread taken along the line 3—3 of Fig. 1.

Extending transversely through the tread 6 from one side to the other, substantially parallel with the tread surface 7 and in line with each transverse row of recesses, is a passage 11 which is preferably square in cross-section. The passages 11 communicate with the inner end of each of the recesses 8 in the row with which they are in line. This is clear from Figs. 2 and 3.

The combination of the recesses 8 with the transverse passages 11 in communication therewith provides a means of permitting cooling air to reach inner portions of the tread which are not reached by cooling air in conventionally built tires. The area of cooling surface for the tread is greatly increased in the improved tire construction, and in addition, the improved construction has the advantages of the cup-type of tread without the objectionable noise created by this type of tread. The reason for the latter will appear hereinafter.

In use, the improved construction provides automatic forced draft ventilation through the recesses 8 and the passages 11 in addition to the cooling action which takes place by reason of the rotational and forward motion of the tire 5. As a row of recesses 8 comes in contact with the roadbed, the weight of the car compresses the tread 6, progressively collapsing the passage 11 and expelling air from the recesses 8 as well as from the passage 11. As the tire continues to rotate the weight of the car is moved forwardly and the passage 11 which had been collapsed returns to its normal shape. As this happens, fresh air rushes into the passages 11 and into the recesses 8 communicating therewith. This venting of the recesses 8 releases any vacuum therein which might otherwise cause objectionable noise as the recesses 8 move out of contact with the roadbed.

By reason of the fact that the rows of recesses 8 and the passages 11 alined therewith are disposed obliquely with respect to the tread surface 7 as the tire rotates, the collapse of the passages 11 and the opening thereof is progressive from one end to the other rather than instantaneous throughout the length thereof, i. e. all of the recesses 8 in any particular row are not sealed off at the same time, but rather the sealing off process progresses from one to the next. This progressive closure prevents the objectionable noise which would otherwise result from the escaping of air entrapped in the passages 11 or in the recesses 8 during compression thereof by the weight of the car.

The improved construction provides a tire which has superior cooling features, which is substantially noiseless, and which has all of the advantages of a cup-type tread without the disadvantages thereof. The improved construction may be applied during original tire manufacture, and it is also particularly well adapted for application during a retreading operation.

Various changes and modifications may be made without departing from the spirit of the invention, and all of such changes are contemplated as may come within the scope of the claims.

What I claim is:

1. In a tire, a rubber tread portion integral therewith and formed with a plurality of recesses in the road contacting surface thereof, said recesses being disposed in obliquely extending transverse rows, and said tread also being formed with a plurality of open ended passages underlying said tread surface, each of said passages being aligned with one of said rows and extending in a substantially straight line from one side of said tread to the other, said passages being positioned below the lower ends of the recesses alined therewith and each of the recesses in a row having its bottom opening into the passage alined with said row.

2. In a tire, a rubber tread portion integral therewith and formed with a plurality of recesses in the road contacting surfaces thereof, said recesses being disposed in obliquely extending substantially parallel transverse rows with the recesses of adjacent rows being laterally staggered, and said tread also being formed with a plurality of open ended passages underlying said tread surface and alined with said rows, said passages being positioned below the lower ends of the recesses alined therewith and extending in a substantially straight line from one side of said tread to the other, each of the recesses in a row having its bottom opening into the passage alined with said row.

3. In a tire, a rubber tread portion formed with a plurality of recesses in the road contacting surface thereof, said recesses being disposed in obliquely extending substantially parallel transverse rows, the recesses in each row being equally spaced both longitudinally and circumferentially and the recesses of adjacent rows being laterally staggered, the rows being so spaced that the circumferential distance between the center of the forwardmost recess in one row and that of the rearmost recess in the forwardly adjacent row is approximately equal to the circumferential distance between the centers of adjacent recesses in said rows, and said tread also being formed with a plurality of open ended passages underlying said tread surface and extending obliquely in a substantially straight line from one side of said tread to the other, each of said recesses being in communication with at least one of said passages.

4. In a tire, a rubber tread portion integral therewith and formed with a plurality of recesses in the road contacting surface thereof, said recesses being disposed in obliquely extending substantially parallel transverse rows, the recesses in each row being equally spaced both longitudinally and circumferentially and the recesses of adjacent rows being laterally staggered, the rows being so spaced that the circumferential distance between the center of the forwardmost recess in one row and that of the rearmost recess in the forwardly adjacent row is approximately equal to the circumferential distance between the centers of adjacent recesses in said rows, said tread also being formed with a plurality of open ended passages underlying said tread surface and alined with said rows, said passages being positioned below the lower ends of the recesses alined therewith and extending in a substantially straight line from one side of said tread to the other, each of the recesses in a row having its bottom opening into the passage alined with said row.

DAVID E. CROOKER.

REFERENCES CITED

The following references are of record in the file of this patent:

UNITED STATES PATENTS

| Number | Name | Date |
|---|---|---|
| 627,483 | Comly | June 27, 1899 |
| 1,877,600 | Seiberling | Sept. 13, 1932 |